United States Patent
Aylon et al.

(10) Patent No.: US 12,541,309 B2
(45) Date of Patent: Feb. 3, 2026

(54) LOW COMPLEXITY CROSSTALK MITIGATION IN A NONVOLATILE MEMORY

(71) Applicant: Apple Inc., Cupertino, CA (US)

(72) Inventors: Amit Pinchas Aylon, Tel Aviv (IL); Yonathan Tate, Kfar Saba (IL); Alex Radinski, Hadera (IL); Itay Sagron, Gedera (IL)

(73) Assignee: Apple Inc., Cupertino, CA (US)

( * ) Notice: Subject to any disclaimer, the term of this patent is extended or adjusted under 35 U.S.C. 154(b) by 16 days.

(21) Appl. No.: 18/422,007

(22) Filed: Jan. 25, 2024

(65) Prior Publication Data

US 2025/0130725 A1  Apr. 24, 2025

Related U.S. Application Data

(60) Provisional application No. 63/591,137, filed on Oct. 18, 2023.

(51) Int. Cl.
*G06F 12/00* (2006.01)
*G06F 3/06* (2006.01)

(52) U.S. Cl.
CPC .......... *G06F 3/0625* (2013.01); *G06F 3/0659* (2013.01); *G06F 3/0673* (2013.01)

(58) Field of Classification Search
CPC ..... G06F 3/0625; G06F 3/0659; G06F 3/0673
USPC ....................................... 711/154
See application file for complete search history.

(56) References Cited

U.S. PATENT DOCUMENTS

| | | |
|---|---|---|
| 7,196,946 B2 | 3/2007 | Chen et al. |
| 7,436,733 B2 | 10/2008 | Mokhlesi |
| 8,031,526 B1 * | 10/2011 | Wu ................ G11C 16/10 365/210.11 |
| 8,050,086 B2 | 11/2011 | Shalvi et al. |
| 8,060,806 B2 | 11/2011 | Shalvi et al. |
| 8,156,398 B2 | 4/2012 | Sommer |
| 8,156,403 B2 | 4/2012 | Shalvi et al. |
| 8,209,588 B2 | 6/2012 | Perlmutter et al. |
| 8,230,300 B2 * | 7/2012 | Perlmutter ........... G06F 3/0604 714/763 |
| 8,374,026 B2 | 2/2013 | Sharon et al. |
| 8,508,989 B2 | 8/2013 | Alrod et al. |
| 8,650,352 B2 | 2/2014 | Weingarten |
| 8,743,615 B2 | 6/2014 | Lee et al. |
| 8,873,288 B2 | 10/2014 | Sharon et al. |
| 9,086,993 B2 | 7/2015 | Sokolov et al. |

(Continued)

*Primary Examiner* — Mohamed M Gebril
(74) *Attorney, Agent, or Firm* — Meitar Patents Ltd.; Daniel Kligler

(57) ABSTRACT

A storage system includes circuitry and multiple memory cells. The memory cells are arranged in multiple Word Lines (WLs), including a target WL. The circuitry includes combinational logic implemented in hardware, the circuitry configured to: read a page from a group of target memory cells in the target WL multiple times to produce multiple respective target binary readouts, read a group of neighbor memory cells in a WL neighboring to the target WL so as to produce a single neighbor binary readout, apply the combinational logic to both the target binary readouts and the neighbor binary readout to produce (i) output bits of the page, and (ii) respective binary confidence levels associated with the output bits, and transmit the output bits and the binary confidence levels to a controller.

17 Claims, 10 Drawing Sheets

(56) References Cited

U.S. PATENT DOCUMENTS

| | | | |
|---|---|---|---|
| 9,229,804 B2 | 1/2016 | Birk et al. | |
| 10,210,941 B1 | 2/2019 | Chen et al. | |
| 10,726,891 B1 | 7/2020 | Prakash et al. | |
| 10,854,304 B1 | 12/2020 | Xu et al. | |
| 10,884,855 B1* | 1/2021 | Yazovitsky | G11C 11/4074 |
| 10,950,292 B1* | 3/2021 | SeyedzadehDelcheh | G11C 11/4078 |
| 11,513,887 B1 | 11/2022 | Tishbi | |
| 11,990,190 B2 | 5/2024 | Maejima | |
| 12,050,514 B1* | 7/2024 | Steiner | H03M 13/152 |
| 2009/0228761 A1* | 9/2009 | Perlmutter | G06F 3/0638 |
| | | | 714/763 |
| 2013/0007559 A1* | 1/2013 | Motwani | G06F 11/073 |
| | | | 714/E11.006 |
| 2014/0331106 A1 | 11/2014 | Baum et al. | |
| 2014/0344519 A1 | 11/2014 | Gurgi et al. | |
| 2024/0313806 A1* | 9/2024 | Steiner | H03M 13/1105 |

* cited by examiner

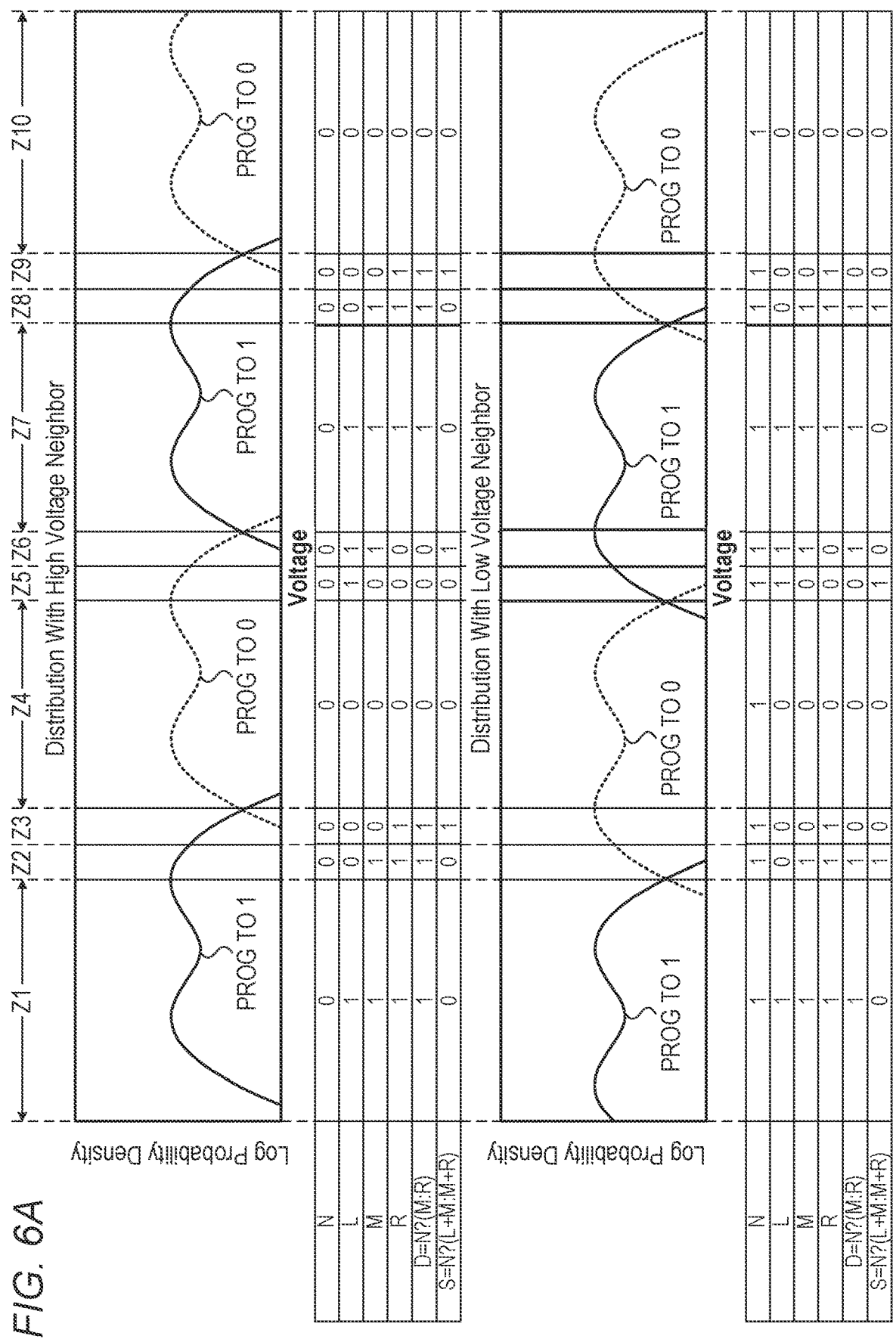

LOW COMPLEXITY CROSSTALK MITIGATION IN A NONVOLATILE MEMORY

CROSS-REFERENCE TO RELATED APPLICATIONS

This application claims the benefit of U.S. Provisional Patent Application 63/591,137, filed Oct. 18, 2023, whose disclosure is incorporated herein by reference.

TECHNICAL FIELD

Embodiments described herein relate generally to data storage, and particularly to methods and systems for low complexity crosstalk mitigation in a nonvolatile memory.

BACKGROUND

A nonvolatile memory may be subjected to various impairments that may cause errors in data read from the memory. For example, crosstalk may cause errors when storage values of target memory cells are affected by memory cells neighbor to the target cells.

Methods for mitigating crosstalk among memory cells are known in the art. For example, U.S. Pat. No. 10,884,855 describes a storage device including circuitry and memory cells that store data in Np programming levels of threshold voltage values. The circuitry defines NRv threshold-sets, each includes Ns read thresholds that define Ns+1 zones, produces Ns readouts by reading, from a target WL, using the Ns read thresholds, a target page that was stored encoded using an Error Correction Code (ECC), and produces a reference readout by reading the target page using optimal read thresholds. The circuitry identifies Np programming levels of memory cells in a neighbor WL for classifying target cells in the target WL into Np·NRv cell-groups. The circuitry calculates, per zone, Np LLR values, for the respective Np programming levels, based on the reference readout, the Ns readouts and the classification, assigns the LLR values to the target cells, and recovers the target page by applying to the assigned LLR values soft decoding for decoding the ECC.

SUMMARY

An embodiment that is described herein includes a storage system, including circuitry and multiple memory cells. The memory cells are arranged in multiple Word Lines (WLs), including a target WL. The circuitry includes combinational logic implemented in hardware, the circuitry configured to: read a page from a group of target memory cells in the target WL multiple times to produce multiple respective target binary readouts, read a group of neighbor memory cells in a WL neighboring to the target WL so as to produce a single neighbor binary readout, apply the combinational logic to both the target binary readouts and the neighbor binary readout to produce (i) output bits of the page, and (ii) respective binary confidence levels associated with the output bits, and transmit the output bits and the binary confidence levels to a controller.

In some embodiments, the multiple target binary readouts include two target binary readouts, and the combinational logic is configured to calculate the binary confidence levels by comparing between the two target binary readouts, and to determine the output bits depending on the binary confidence levels and on the neighbor binary readout. In other embodiments, the multiple target binary readouts include a left target binary readout, a middle target binary readout, and a right target binary readout, and the combinational logic is configured to set the output bits to respective bits of the middle binary readout, and to calculate the binary confidence levels by comparing between the left target binary readout and the middle target binary readout, or between the middle target binary readout and the right target binary readout depending on the neighbor binary readout. In yet other embodiments, the multiple target binary readouts include a left target binary readout, a middle target binary readout, and a right target binary readout, and the combinational logic is configured to calculate the output bits by selecting between the middle target binary readout and one of the left target binary readout and the right target binary readout based on the neighbor binary readout.

In an embodiment, the multiple target binary readouts include a left target binary readout, a middle target binary readout, and a right target binary readout, and the combinational logic is configured to calculate the binary confidence levels by selecting, based on the neighbor binary readout, between (i) a first comparison outcome between the middle target binary readout and the left target binary readout, and (ii) a second comparison outcome between the middle target binary readout and the right target binary readout. In another embodiment, at least some of the memory cells in the group are subjected to voltage shifts due to respective neighbor memory cells having high or low voltages, and the combinational logic is configured to determine the output bits and the binary confidence levels so as to compensate for the voltage shifts. In yet another embodiment, a voltage axis is divided by multiple specified read thresholds into high confidence zones and low confidence zones, and the combinational logic is configured to determine the output bits in the high confidence zones independently of the neighbor memory cells.

In some embodiments, the combinational logic is configured to set undetermined output bits for target memory cells evaluated as having low confidence levels. In other embodiments, the circuitry resides in a memory device that includes the memory cells.

There is additionally provided, in accordance with an embodiment that is describe herein, a method for data storage, including, in a storage system that includes circuitry including combinational logic implemented in hardware, and multiple memory cells arranged in multiple Word Lines (WLs), including a target WL, reading by the circuitry a page from a group of target memory cells in the target WL multiple times to produce multiple respective target binary readouts. A group of neighbor memory cells in a WL neighboring to the target WL is read by the combinational logic so as to produce a single neighbor binary readout. The combinational logic is applied to both the target binary readouts and the neighbor binary readout to produce (i) output bits of the page, and (ii) respective binary confidence levels associated with the output bits. The output bits and the binary confidence levels are transmitted to a controller.

These and other embodiments will be more fully understood from the following detailed description of the embodiments thereof, taken together with the drawings in which:

BRIEF DESCRIPTION OF THE DRAWINGS

FIGS. 6A-6B are diagrams that schematically illustrate TVDs of memory cells in a target WL affected by memory cells of a neighbor WL, as well as truth tables and combinational logic implementing crosstalk mitigation using three target readouts, in accordance with other embodiments that are described herein.

DETAILED DESCRIPTION OF EMBODIMENTS

Overview

Figure 1:
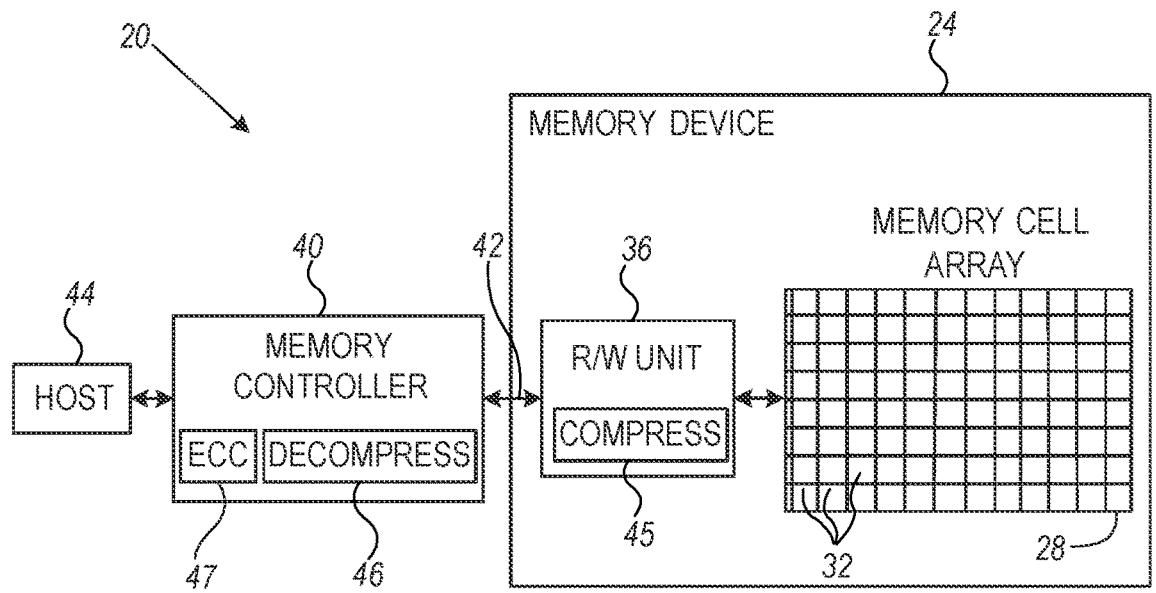
FIG. 1 is a block diagram that schematically illustrates a memory system, in accordance with an embodiment that is described herein.

Embodiments that are described herein provide methods, systems, and circuits for low complexity mitigation of crosstalk in nonvolatile memory devices.

A memory device typically comprises an array of memory cells arranged in Word Lines (WLs) containing groups of memory cells that can be read concurrently. Each memory cell in the array can be programmed to one of multiple predefined programming levels. In a memory device whose memory cells store multiple bits per cell, each programming level represents a dedicated combination of multi-bit values. Memory cells are typically read from a WL in units of a data page.

The voltages of memory cells programed to a given programming level are typically distributed about that programming level. Due to these voltage distributions and to various impairments, the data read from a group of memory cells may contain errors. To increase storage reliability, data is typically stored in the memory device encoded using a suitable Error Correction Code (ECC), and upon reading, decoded using the ECC to correct errors, if any.

The voltages of target memory cells may be affected by the voltages of adjacent memory cells, which may result in errors. Such phenomenon is also referred to as "crosstalk". The number of errors caused by crosstalk may depend on the geometry and density of the memory array, and on the voltages to which the neighbor cells are programmed. Memory cells in a target WL are primarily affected by neighbor memory cells in the nearest WL that was programmed after the target WL. Crosstalk may be also caused by neighbor memory cells that were programmed before the target memory cells. A neighbor memory cell having a high voltage typically causes the voltage of the victim target cell to increase. A neighbor memory cell having a low voltage typically causes the voltage of the victim target cell to decrease. High and low voltages of neighbor memory cells may be specified above and below respective high and low read thresholds.

In a typical storage system, a memory controller is coupled to a memory device via a suitable link. The memory controller stores data in the memory device and retrieves the data from the memory device on demand. In some modes of operation, the memory controller reads data from a large number of WLs sequentially, e.g., in reading a file stored in the memory. In such cases it is important to perform fast read operations to maximize the reading throughput, with minimal or no reduction in reliability.

In principle, crosstalk mitigation could be applied by first estimating the level of crosstalk caused to the target memory cells being read by neighbor memory cells, and then compensating for that crosstalk, accordingly. Such methods, however, are typically highly complex, which may limit the achievable reading throughput.

In the disclosed embodiments, neighbor memory cells are sampled and used efficiently for crosstalk mitigation. To this end, the target WL is sampled a small number of times (e.g., two or three times) using multiple different read voltages (RVs), whereas the neighbor WL is sampled only once (e.g., using an RV positioned in the middle of the supported voltage range). The target and neighbor readouts are processed using combinational logic, to efficiently reconstruct the data bits and corresponding confidence levels respectively assigned to the data bits. For maximal reading throughput, the disclosed embodiments may be implemented in hardware within the memory device.

Consider a storage system, including circuitry that includes combinational logic implemented in hardware, and multiple memory cells arranged in multiple WLs, including a target WL. The circuitry reads a page from a group of target memory cells in the target WL multiple times to produce multiple respective target binary readouts, and further reads a group of neighbor memory cells in a WL neighboring to the target WL so as to produce a single neighbor binary readout. The circuitry applies the combinational logic to both the target binary readouts and the neighbor binary readout to produce (i) output bits of the page, and (ii) respective binary confidence levels associated with the output bits, and transmits the output bits and the binary confidence levels to a controller.

In a reading scheme based on two target binary readouts, the combinational logic calculates the binary confidence levels by comparing between the two target binary readouts, and determines the output bits depending on the binary confidence levels and on the neighbor binary readout. In a reading scheme based on three target binary readouts-a left target binary readout, a middle target binary readout, and a right target binary readout, the combinational logic sets the output bits to respective bits of the middle binary readout, and calculates the binary confidence levels by comparing between the left target binary readout and the middle target binary readout, or between the middle target binary readout and the right target binary readout depending on the neighbor binary readout.

In another embodiment, the combinational logic calculates the output bits by selecting between the middle target binary readout and one of the left target binary readout and the right target binary readout based on the neighbor binary readout. In yet another embodiment, the combinational logic calculates the binary confidence levels by selecting, based on the neighbor binary readout, between (i) a first comparison outcome between the middle target binary readout and the left target binary readout, and (ii) a second comparison outcome between the middle target binary readout and the right target binary readout.

In an embodiment, at least some of the target memory cells read from the target WL are subjected to voltage shifts due to respective neighbor memory cells having high or low voltages. In this embodiment the combinational logic determines the output bits and the binary confidence levels so as to compensate for the voltage shifts.

The voltage axis of the voltages of the memory cells is divided by multiple specified read thresholds into high confidence zones and low confidence zones. In an embodiment of a reading scheme, the combinational logic determines the values of the output bits in the high confidence zones independently of neighbor memory cells.

In some embodiments, the output bits and binary confidence levels are classified into three categories, namely (i) '1' with high confidence, (ii) '0' with high confidence, and (iii) low confidence. In these embodiments the combinational logic sets undetermined output bits for target memory cells evaluated as having low confidence levels.

In an embodiment, the circuitry of the storage system including the combinational logic resides in a memory device comprising the memory cells.

In the disclosed techniques crosstalk mitigation is based on processing multiple target readouts and a single neighbor readout using hardware implemented combinational logic. The neighbor cells information is used for improving the determination of the page bits being read and corresponding confidence levels. Applying the disclosed schemes result in compensating for shifts caused to TVDs of target cells by crosstalk, which increases the probability of successful ECC decoding, while requiring low bandwidth traffic between the memory device and memory controller. The disclosed embodiments provide low complexity crosstalk mitigation schemes, resulting in high read throughput and low power consumption.

System Description

FIG. 1 is a block diagram that schematically illustrates a memory system 20, in accordance with an embodiment that is described herein. System 20 can b used in various host systems and devices, such as in computing devices, cellular phones or other communication terminals, memory removable modules ("disk-on-key" devices), Solid State Disks (SSD), digital cameras, music and other media players and/or any other system or device in which data is stored and retrieved.

System 20 includes a memory device 24 that stores data in a memory cell array 28. The memory cell array includes multiple memory cells 32. The term "memory cell" is typically used to describe any memory cell that holds a continuous, analog level of a physical quantity, such as an electrical voltage or charge. Memory cell array 28 may include memory cells of any kind, such as, for example, NAND, NOR and CTF Flash cells, PCM, NROM, FRAM, MRAM and DRAM cells. Memory cells 32 may include Single-Level Cells (SLC) Cells or Multi-Level (MLC, also referred to as multi-bit cells). Alternatively, memory cells that store a higher number of bits per cell, such as Triple-Level Cells (TLC) and Quad-Level Cells (QLC) can also be used.

The charge levels stored in the memory cells and/or the analog voltages or currents written into and read out of the cells are referred to herein collectively as analog values or storage values. Although the embodiments described herein mainly address threshold voltages, the methods and systems described herein may be used with any other suitable kind of storage values.

System 20 stores data in memory cells 32 by programming the memory cells to assume respective programming states, which are also referred to as "programming levels". The programming states are selected from a finite set of possible states, and each state corresponds to a certain nominal storage value. For example, a 2 bit/cell MLC can be programmed to assume one of four possible programming states by writing one of four possible nominal storage values to the cell. Alternatively, memory cells that store a higher number of bits per cell such as TLC memory cells that store three bits per cell and QLC memory cells that store four bits per cell can also be used.

Memory device 24 includes a reading/writing (R/W) unit 36, which converts data for storage in the memory device to storage values and writes them into memory cells 32. In alternative embodiments, the R/W unit does not perform the conversion, but is provided with voltage samples, i.e., with the storage values for storage in the cells. When reading data out of memory cell array 28, R/W unit 36 converts the storage values of memory cells 32 into digital samples having a resolution of one or more bits. The R/W unit typically reads data from memory cells 32 by comparing the storage values of the cells to one or more read thresholds. Data is typically written to and read from the memory cells in groups that are referred to as pages. In some embodiments, the R/W unit can erase a group of cells 32 by applying one or more negative erasure pulses to the memory cells.

The storage and retrieval of data in and out of memory device 24 is performed by a memory controller 40, which communicates with device 24 over a suitable interface 42. In some embodiments, memory controller 40 produces the storage values for storing in the memory cells and provides these values to R/W unit 36. Alternatively, memory controller 40 may provide the data for storage, and the conversion to storage values is carried out by the R/W unit internally to the memory device.

Memory controller 40 communicates with a host 44, for accepting data for storage in the memory device and for outputting data retrieved from the memory device. In some embodiments, some or even all of the functions of memory controller 40 may be implemented in hardware. Alternatively, memory controller 40 may include a microprocessor that runs suitable software, or a combination of hardware and software elements.

In some embodiments, R/W unit 36 includes a data compression module 45, which compresses some of the information that is to be sent to memory controller 40. The memory controller includes a decompression module 46, which decompresses the compressed information received from memory device 24. In particular, R/W unit 36 may produce confidence levels of the storage values read from memory cells 32, and data compression module 45 may compress these confidence levels and send the compressed confidence levels to memory controller 40. (In some embodiments, data compression module 45 can also be used for compressing other types of information, such as stored data that is retrieved from memory cells 32.)

In some embodiments, the memory device applies to a target WL two or more read operations to produce two or more local readouts using two or more respective pre-assigned read thresholds. Moreover, the memory device reads a WL neighboring the target WL, using a pre-assigned read threshold, to produce a neighbor readout. Based on the two or more target readouts and the neighbor readout the memory device determines hard storage values and associated binary confidence levels to be transferred to the memory controller.

The memory controller uses the storage values read from memory cells 32, and the associated confidence levels, to reconstruct the stored data. For example, memory controller 40 may include an Error Correction Code (ECC) unit 47, which encodes the data for storage using a suitable ECC, and decodes the ECC of the data retrieved from memory cells 32. ECC unit 47 may apply any suitable type of ECC, such as, for example, a Low-Density Parity Check (LDPC) code or a Bose-Chaudhuri-Hocquenghem (BCH) code. In some embodiments, ECC unit 47 uses the confidence levels to improve the ECC decoding performance. Several example methods for obtaining and compressing confidence levels, as well as for using the confidence levels in ECC decoding, are described, for example, in a U.S. Pat. No. 8,230,300, whose disclosure is incorporated herein by reference. (In the event of any inconsistencies between any incorporated document and this document, it is intended that this document control.)

The memory system configuration of FIG. 1 is an example memory system configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity.

In the example system configuration shown in FIG. 1, memory device 24 and memory controller 40 are implemented as two separate Integrated Circuits (ICs). In alternative embodiments, however, the memory device and the memory controller may be integrated on separate semiconductor dies in a single Multi-Chip Package (MCP) or System on Chip (SoC), and may be interconnected by an internal bus. Further alternatively, some or all of the circuitry of the memory controller may reside on the same die on which the memory array is disposed. Further alternatively, some or all of the functionality of memory controller 40 can be implemented in software and carried out by a processor or other element of the host system. In some embodiments, host 44 and memory controller 40 may be fabricated on the same die, or on separate dies in the same device package.

In some implementations, a single memory controller may be connected to multiple memory devices 24. In yet another embodiment, some or all of the memory controller functionality may be carried out by a separate unit, referred to as a memory extension, which acts as a slave of memory device 24. Typically, memory controller 40 includes a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

The different elements of R/W unit 36 may be implemented in hardware, such as using one or more Application-Specific Integrated Circuits (ASICs) or Field-Programmable Gate Arrays (FPGAs).

Memory cells 32 of memory cell array 28 are typically arranged in a grid having multiple rows and columns, commonly referred to as word lines and bit lines, respectively. The memory array is typically divided into multiple pages, i.e., groups of memory cells that are programmed and read simultaneously. Memory cells 32 are typically erased in groups of word lines that are referred to as erasure blocks.

In some embodiments, a given memory device includes multiple memory cell arrays, which may be fabricated on separate dies.

In the description that follows, and in the claims, the term "circuitry" refers to elements of memory device 24, excluding interface 42 and memory cell array 28, to elements of memory controller implemented in hardware, or both. In the example of FIG. 1, the circuitry includes R/W unit 36, including data compression module 45.

Efficient Crosstalk Mitigation Schemes

In the description that follows schemes for crosstalk mitigation include the following main steps: (1) sample the target WL multiple times (e.g., two or three times) to generate multiple target readouts, (2) sample the neighbor WL (e.g., the lower WL) once to generate a neighbor readout, and (3) process the target readouts and the neighbor readout using combinational logic (also referred to herein as "comb-logic") to produce recovered data bits and confidence levels assigned to the data bits.

Typically, each sampling operation involves setting one or more read thresholds at mid zones between nominal programming levels. The target readouts and the neighbor readout are typically cached within the memory device and provided to the combinational logic.

Figure 2:
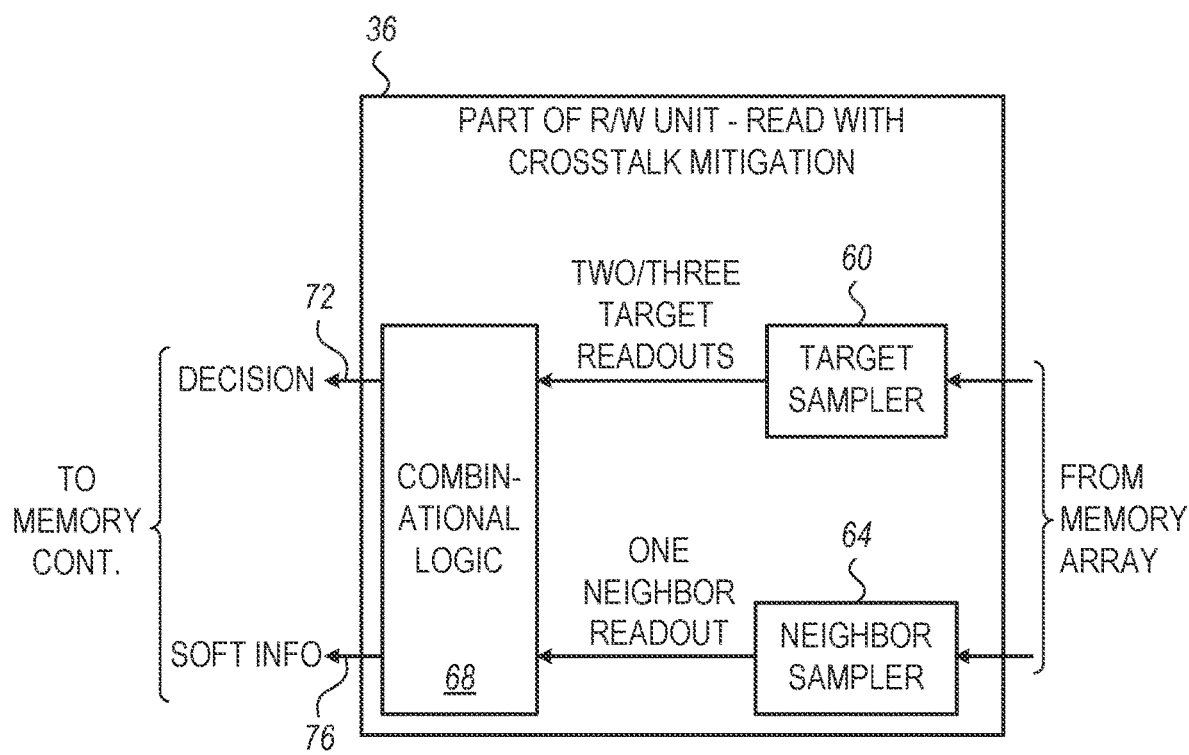
FIG. 2 is a block diagram that schematically illustrates part of a R/W unit performing a read operation with crosstalk mitigation, in accordance with an embodiment that is described herein.

FIG. 2 is a block diagram that schematically illustrates part of R/W unit 36 performing a read operation with crosstalk mitigation, in accordance with an embodiment that is described herein.

The description of FIG. 2 refers to elements of the R/W unit that are related to reading data from a target WL while mitigating crosstalk caused by memory cells of a neighbor WL. In FIG. 2, the R/W unit comprises a target sampler 60, a neighbor sampler 64 and combinational logic 68. The target sampler reads a group of memory cells (e.g., a page) from the target WL in memory array 28.

The target sampler reads the page from the target WL multiple times using multiple prespecified read thresholds (or groups of read thresholds) to produce multiple target readouts. The number of target readouts depends on the underlying scheme as will be described below. In the present example the target sampler produces two or three target readouts. The neighbor sampler reads a corresponding group of memory cells (a page) from a WL in memory array 28 neighboring to the target WL, using a prespecified read threshold, to produce a single neighbor readout.

Combinational logic 68 applies to both the target readouts and the neighbor readout a combinational logic scheme whose outputs include (i) decision bits 72 representing the reconstructed data bits of the page, and (ii) soft information 76 specifying confidence levels assigned respectively to the decision bits. The decision bits and confidence levels are provided to the memory controller 40 via link 42. In some embodiments the confidence levels are binary confidence levels having two values—a high confidence level and a low confidence level.

Figure 3:
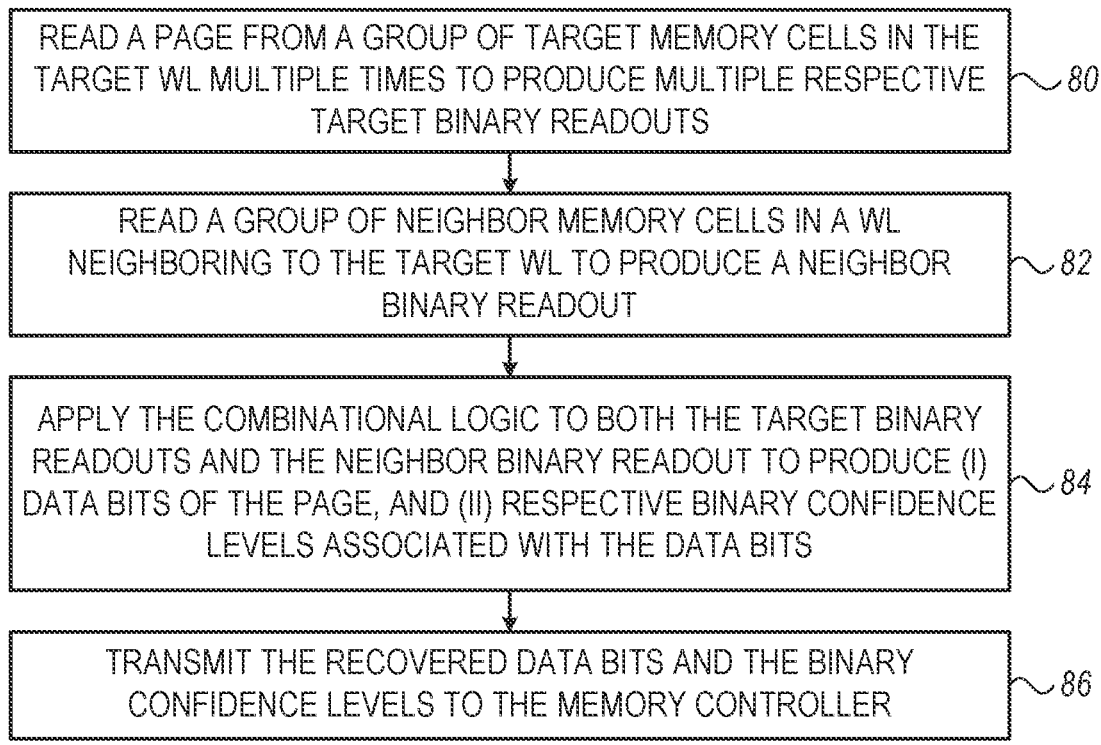
FIG. 3 is a flow chart that schematically illustrates a method for crosstalk mitigation, accordance with an embodiment that is described herein.

FIG. 3 is a flow chart that schematically method for crosstalk mitigation, in illustrates a accordance with an embodiment that is described herein.

The method will be described as executed by R/W unit 36 of FIG. 2.

The method begins at a target sampling step 80, with target sampler 60 reading a page from a group of target memory cells in the target WL multiple times to produce multiple respective target binary readouts. In the present example the target sampler generates two or three target readouts, depending on the underlying mitigation scheme. Example crosstalk mitigation scheme will be described further below.

At a neighbor sampling step 82, neighbor sampler 64 reads a group of neighbor memory cells in a WL neighboring to the target WL to produce a neighbor binary readout.

At a readout processing step 84, combinational logic 68 processes both the target binary readouts and the neighbor binary readout to produce (i) data bits of the page being read, and (ii) respective binary confidence levels associated with the data bits.

At an output step 86, the R/W unit transmits the recovered data bits and binary confidence levels to memory controller 40, and the method terminates.

In the description that follows, example crosstalk mitigation schemes are provided for TLC memory cells storing three bits per cell. Each of the memory cells is programmed to one or eight programming voltages denoted PV1 .... PV8. Diagrams depicting Threshold Voltage Distributions (TVDs) below refer to a page for which PV1, PV2, PV5 and PV6 represent a programmed '1' bit, whereas PV3, PV4, PV7 and PV8 (in dotted line) represent a '0' bit.

In the disclosed embodiments, at least some of the memory cells read are subjected to voltage shifts due to respective neighbor memory cells having high or low voltages. The combinational logic for crosstalk mitigation determines output bits and associated binary confidence levels so as to compensate for the voltage shifts.

Crosstalk Mitigation Schemes with Two Target Readouts

Figure 4A:
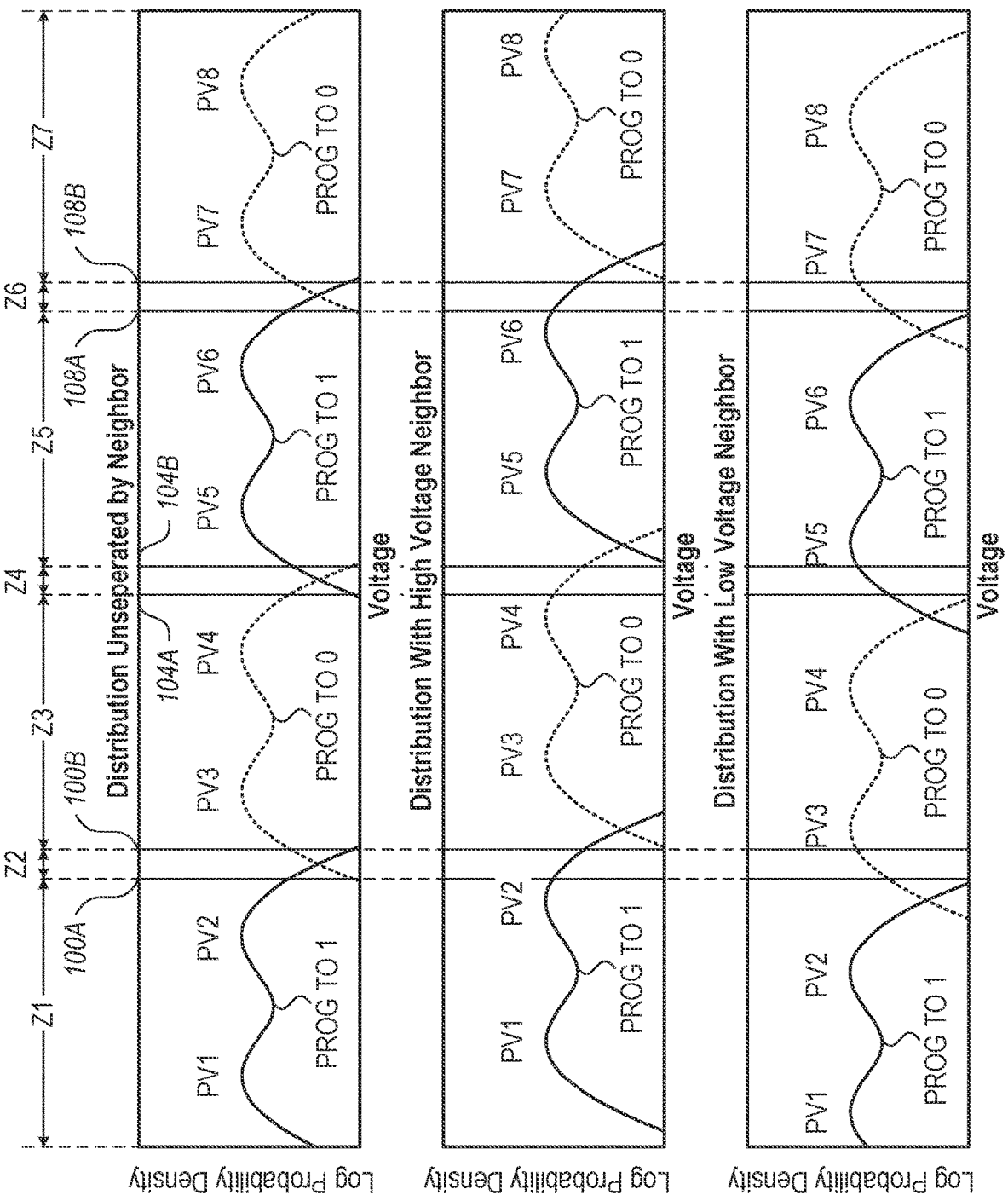
FIGS. 4A-4C are diagrams that schematically illustrate TVDs of memory cells in a target WL affected by memory cells of a neighbor WL, as well as truth tables and combinational logic implementing crosstalk mitigation using two target readouts, in accordance with embodiments that are described herein.
Figure 4B:
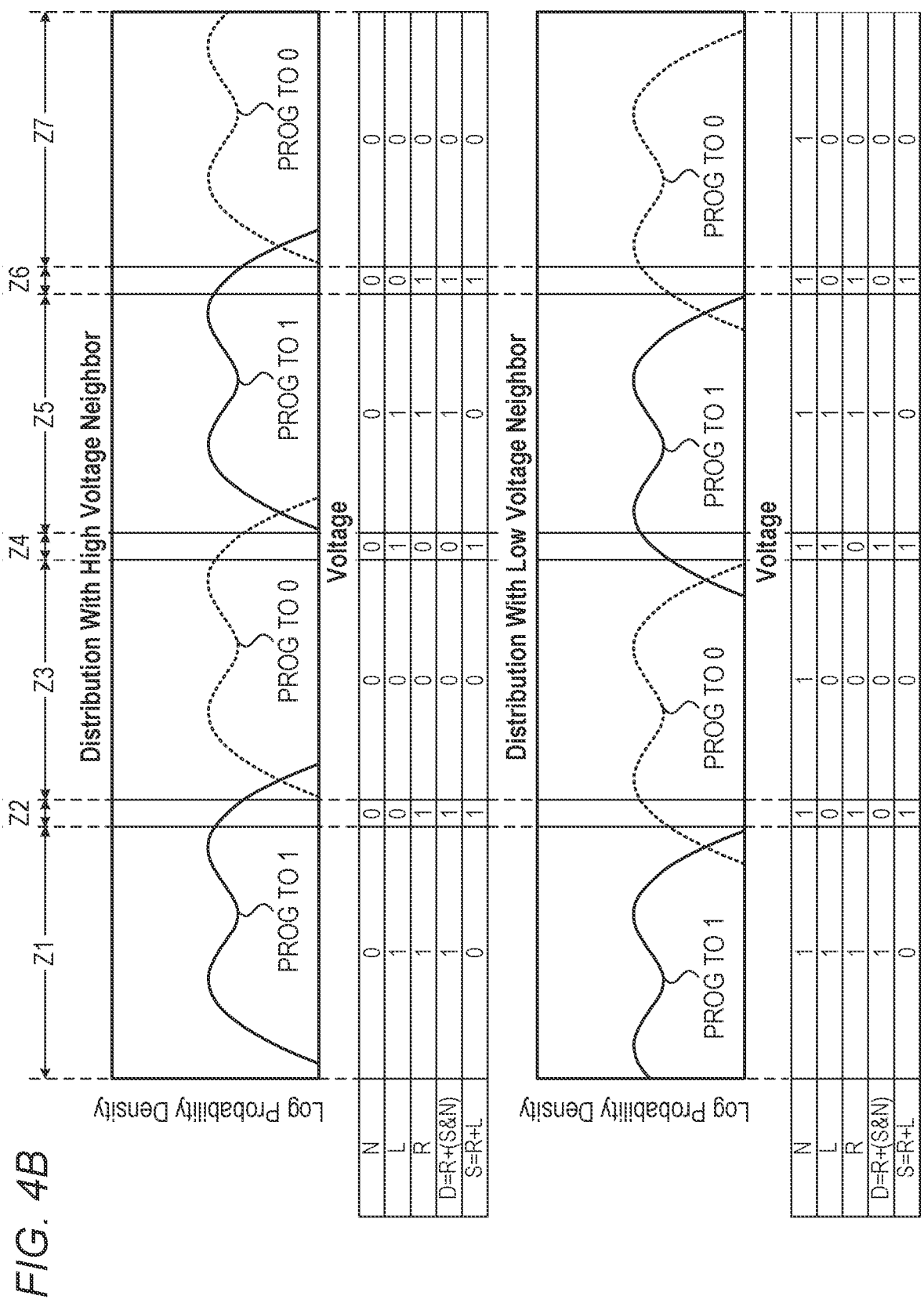
Figure 4C:
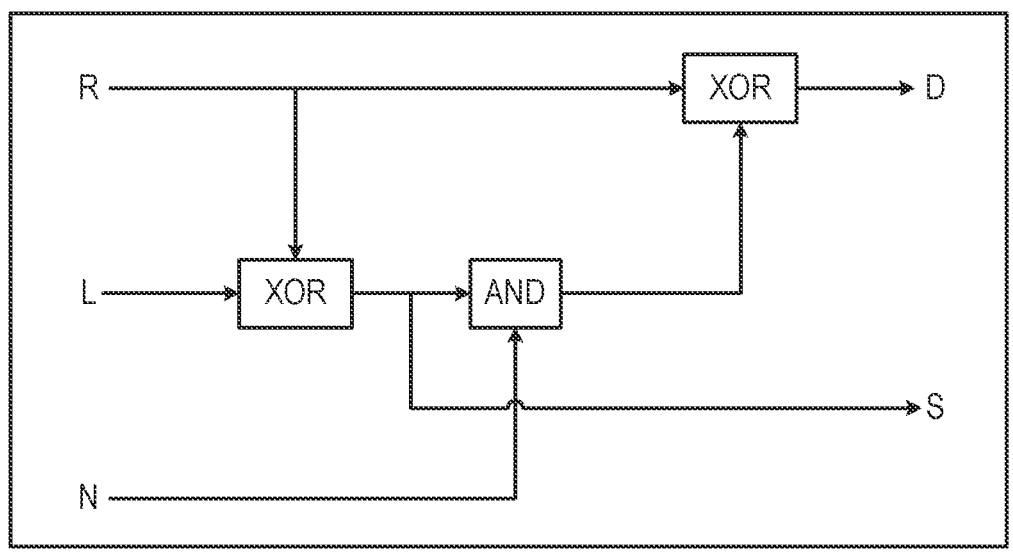

FIGS. 4A-4C are diagrams that schematically illustrate TVDs of memory cells in a target WL affected by memory cells of a neighbor WL, as well as truth tables and combinational logic implementing crosstalk mitigation using two target readouts, in accordance with embodiments that are described herein.

In the diagrams below, the horizontal axis is a voltage axis, and the vertical axis represents log probability densities of the TVDs.

Consider a reading scheme in which target sampler 60 reads the target WL twice, to produce a left-side readout and a right-side readout. In FIG. 4A, Read Voltages (RVs) 100A, 104A and 108A are used for sampling the left-side readout (denoted 'L') and RVs 100B, 104B and 108B are used for sampling the right-side readout (denoted 'R'). The RVs divide the voltage axis into zones denoted Z1 .... Z7.

The upper diagram in FIG. 4A, depicts the TVDs of the entire memory cells in the page. Without using neighbor cells information, the bits read may be assigned high or low confidence levels depending on the zones. Table 1 summarizes bit values and confidence levels per zone when ignoring neighbor cell information.

TABLE 1

Bit values and confidence levels per zone when ignoring neighbor cell information.

| Zone | Bit value | Confidence level |
|---|---|---|
| Z1, Z5 | '1' | High confidence |
| Z2, Z4, Z6 | '0' or '1' (Erasure) | Low confidence |
| Z3, Z7 | '0' | High confidence |

As will be described below, to reduce the number of read errors and increase the probability of successful ECC decoding, the bit values in zones Z2, Z4 and Z6 may be determined based on a neighbor readout sampled from a neighbor WL.

The middle diagram of FIG. 4A depicts TVDs of the target memory cells whose neighbor memory cells have high voltage values. Due to the high voltage neighbor cells, the TVDs shift to the right (to higher voltages). In this case, most of the memory cells falling in zones Z2 and Z6 are likely to have been programmed to '1', and the memory cells falling in Z4 are likely to have been programmed to '0'. Therefore, bit values in Z2, Z4 and Z6 may be advantageously determined depending on the voltages of the neighbor cells, in an embodiment.

The bottom diagram of FIG. 4A depicts the TVDs of the target memory cells whose neighbor memory cells have low voltage values. Due to the low voltage neighbor cells, the TVDs shift to the left (to lower voltages). In this case, most of the memory cells falling in zones Z2 and Z6 are likely to have been programmed to '0', and the memory cells falling in Z4 are likely to have been programmed to '1'. Therefore, here too, bit values in Z2, Z4 and Z6 may be advantageously determined depending on the voltages of the neighbor cells, in an embodiment.

Without taking the neighbor cells into consideration, the read bits are classified into three categories (as depicted in Table 1 above): high confidence '1' bits, high confidence '0' bits, and low confidence undetermined bits. By using the neighbor cell information, the resulting data bits may be classified into four categories, by splitting the undetermined bits into low confidence '1' bits and low confidence '0' bits. Table 2 summarizes bit values and confidence levels per zone depending on the neighbor voltage.

TABLE 2 bit values and confidence levels per zone depending on neighbor cell voltage.

| Zone | Neighbor voltage | Bit value | Confidence |
|---|---|---|---|
| Z1, Z5 | Don't care | 1 | High confidence |
| Z2, Z6 | High voltage | 1 | Low confidence |
|  | Low voltage | 0 | Low confidence |
| Z4 | High voltage | 0 | Low confidence |
|  | Low voltage | 1 | Low confidence |
| Z3, Z7 | Don't care | 0 | High confidence |

Compared to reading the target memory cells while ignoring neighbor cell information, in zones Z2, Z4 and Z6 the confidence levels remain low, but the corresponding bit values are determined to a value '0' or '1' depending on whether the neighbor cell increases the probability of '0' or '1' in the zone. Moreover, in the high confidence zones Z1, 25, Z3 and Z7, the bit values and confidence levels are not affected by the voltages of the neighbor memory cells.

The upper diagram in FIG. 4B depicts TVDs of target memory cells affected by neighbor memory cells having high voltages, whereas the lower diagram depicts TVDs of target memory cells affected by neighbor memory cells having low voltages.

In the truth tables of FIG. 4B (and other truth tables further below), the inputs include the neighbor readout N, the target left-side readout L and the target right-side readout R. The truth table outputs include the decision bits D and the confidence levels S.

In the description that follows, a confidence level bit in S having a '1' (or '0') value refers to a low (or high) confidence level. In addition, a neighbor readout bit in N having a '1' (or '0') value refers to a low (or high) neighbor voltage. Alternatively, opposite polarities of the S and/or N bits can also be used.

In accordance with the truth tables of FIG. 4B, the confidence level bits are calculated using the logical expression S=R+L, and the data bits are calculated using the logical expression D=R+ (S&N). In these logical expressions, the symbols '+' and '&' respectively denote a bitwise logical XOR operation, and a bitwise logical AND operation.

In accordance with the truth tables, the low confidence zones (Z2, Z4 and Z6) correspond to bits in which R and L differ from one another. In these zones the D data bits depend on the bits of N. In contrast, in the high confidence zones (Z1, Z3, Z5 and Z7), corresponding to bits is which R=L (with high confidence), D does not depend on N.

FIG. 4C is a block diagram that schematically illustrates combinational logic implementing the truth tables of FIG. 4B, in accordance with an embodiment that is described herein.

In the block diagram, the combinational circuit receives the target readouts L and R, and the neighbor readout N. In some embodiments, N is generated by reading the neighbor WL using a read voltage positioned at (or close to) a middle voltage of the supported voltage axis, e.g., at the middle of zone 4. Alternatively, N can be sampled using any other suitable read voltage. The combinational logic outputs data bits D and respective confidence levels S assigned to the data bits. In the present example, the combinational logic comprises two logical XOR gates and a logical AND gate.

The combinational logic circuit of FIG. 4C is given by way of example, and other suitable combinational logic circuits can be used for implementing the truth table of FIG. 4B. For example, in an alternative embodiment, a similar combinational logic can be derived in which the roles of R and L are exchanged. Further alternatively, the truth tables may be implemented using a lookup table instead of or in addition to using explicit logical gates.

Crosstalk Mitigation Schemes with Three Target Readouts

Figure 5A:
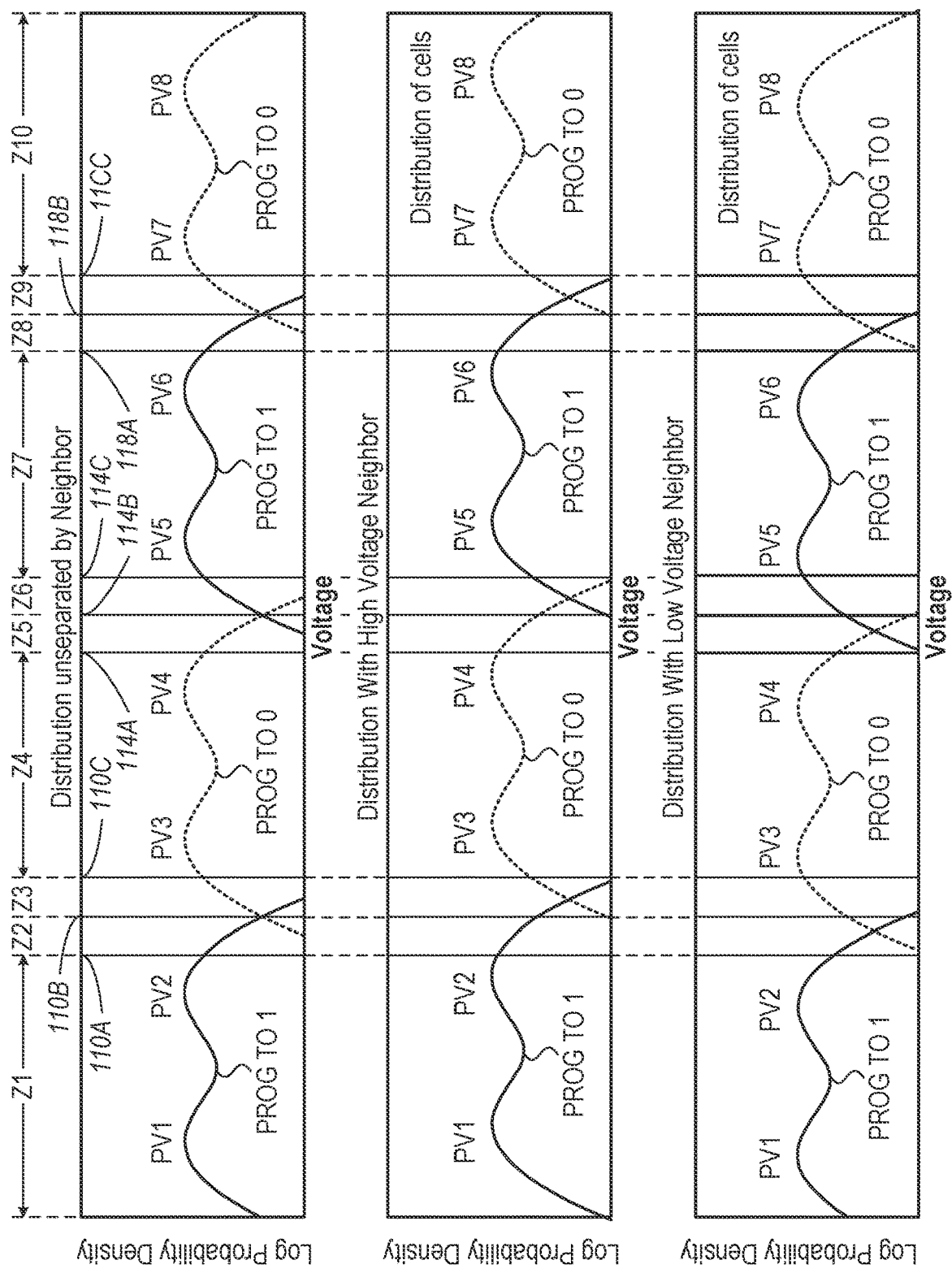
FIGS. 5A-5C are diagrams that schematically illustrate TVDs of memory cells in a target WL affected by memory cells of a neighbor WL, as well as truth tables and combinational logic implementing crosstalk mitigation using three target readouts, in accordance with embodiments that are described herein.
Figure 5B:
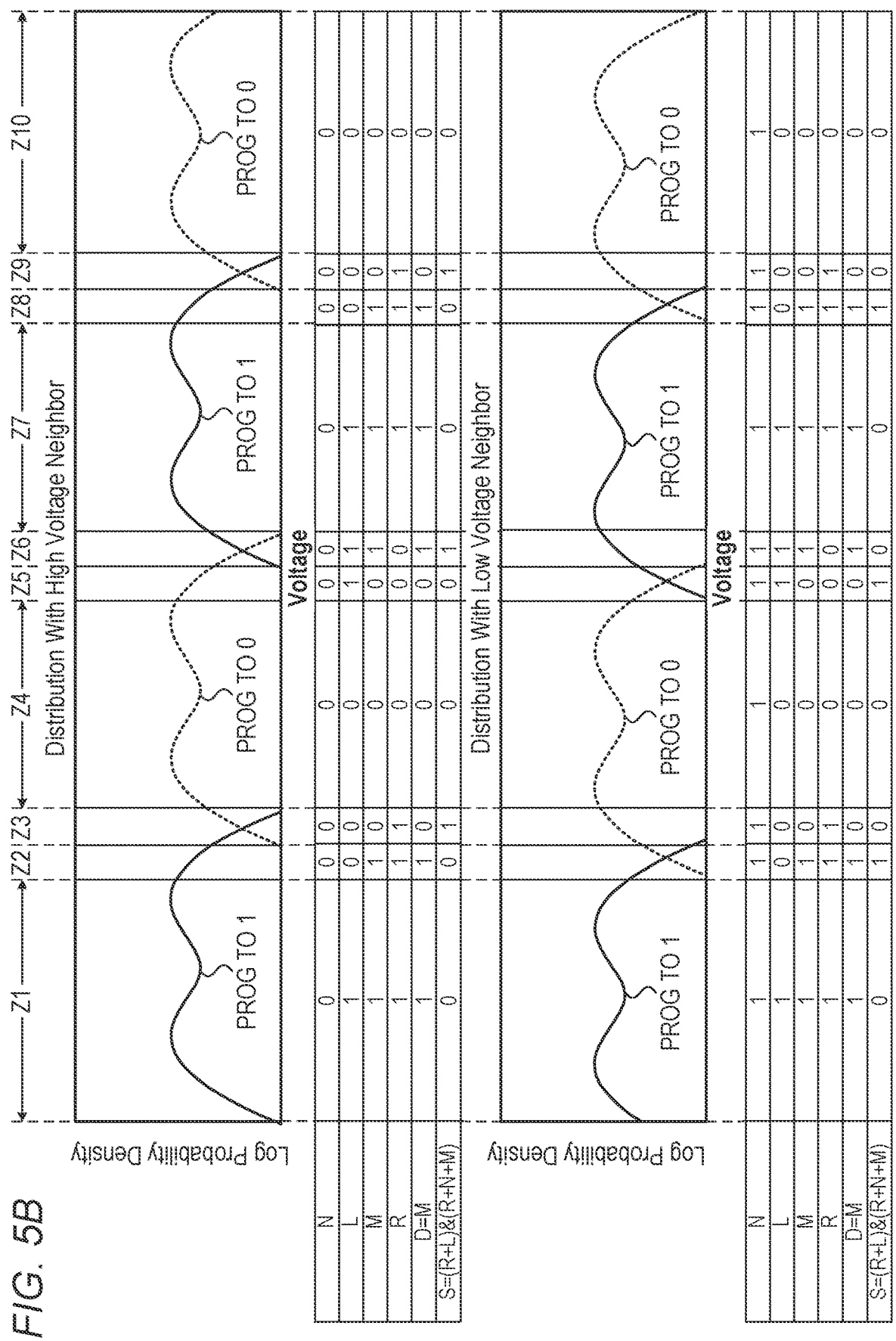
Figure 5C:
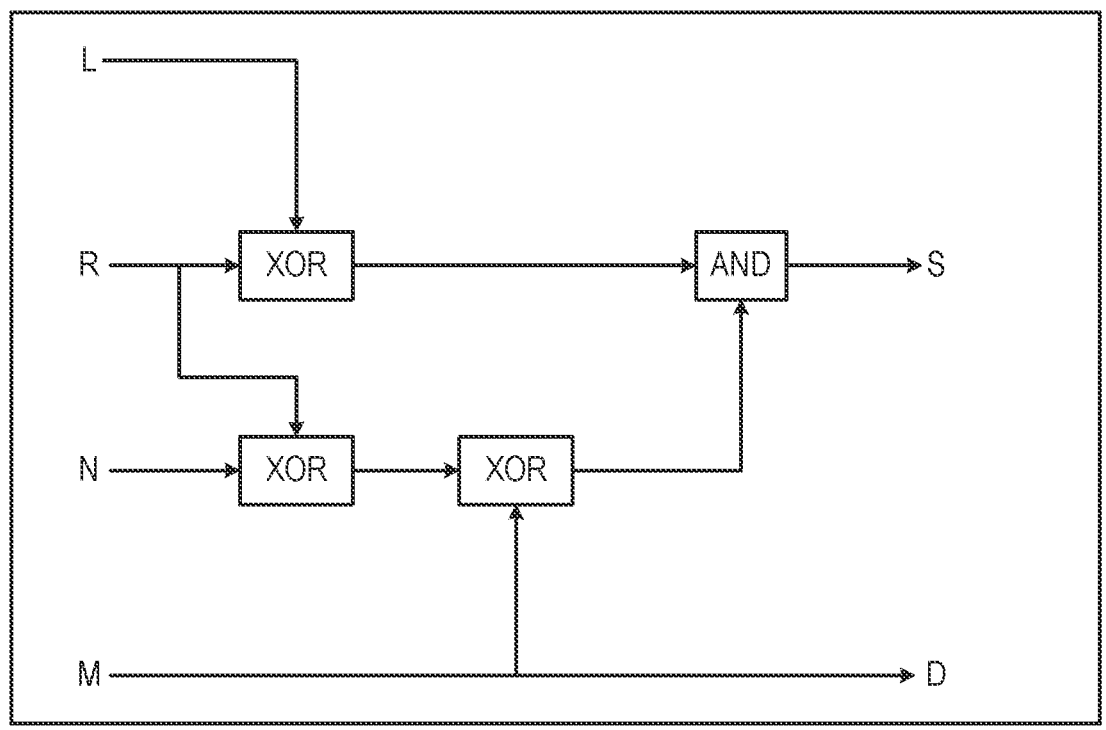

FIGS. 5A-5C are diagrams that schematically illustrate TVDs of memory cells in a target WL affected by memory cells of a neighbor WL, as well as truth tables and combinational logic implementing crosstalk mitigation using three target readouts, in accordance with embodiments that are described herein.

Consider a reading scheme in which target sampler 60 reads the target WL three times to produce a left-side readout L, a middle readout (denoted 'M'), and a right-side readout R. In FIG. 5A, RVs 110A, 114A and 118A are used for sampling the L readout, RVs 110B, 114B and 118B are used for sampling the M readout, and RVs 110C, 114C and 118C are used for sampling the R readout. In this scheme, the RVs divide the voltage axis into zones denoted Z1 . . . . Z10.

The upper diagram in FIG. 5A, depicts the TVDs of the entire memory cells in the page read. Without using neighbor cells information, the bits read may be assigned high or low confidence levels depending on the zones. Table 3 summarizes bit values and confidence levels per zone when ignoring neighbor cell information.

TABLE 3

Bit values and confidence levels per zone when ignoring neighbor cell information.

| Zone | Bit value | Confidence level |
| --- | --- | --- |
| Z1, Z7 | '1' | High confidence |
| Z2, Z6, Z8 | '1' | Low confidence |
| Z3, Z5, Z9 | '0' | Low confidence |
| Z4, Z10 | '0' | High confidence |

As will be described below, to increase the probability of successful ECC decoding, confidence levels assigned in the low confidence zones Z2, Z3, Z5, Z6, Z8 and Z9 may be determined based on the neighbor sample N.

The middle diagram of FIG. 5A depicts the TVDs of the target memory cells whose neighbor memory cells have high voltage values. Due to the high voltage neighbor cells, the TVDs shift to the right (to higher voltages). The bottom diagram of FIG. 5A depicts the TVDs of the target memory cells whose neighbor memory cells have low voltage values. Due to the low voltage neighbor cells, the TVDs shift to the left (to lower voltages). In the present scheme, the confidence levels (in low confidence zones) may be modified based on the neighbor readout. For example, in Z2, when the neighbor cell has a high voltage, the data bit is likely to have been programmed to '1' with high confidence. Table 4 summarizes bit values and confidence levels per zone depending on the neighbor voltage.

TABLE 4 bit values and confidence levels per zone depending on neighbor voltage.

| Zone | Neighbor voltage | Bit value | Confidence |
| --- | --- | --- | --- |
| Z1, Z7 | Don't care | 1 | High |
| Z2, Z8 | High voltage | 1 | Low -> High |
|  | Low voltage | 1 | Low |
| Z3, Z9 | High voltage | 0 | Low |
|  | Low voltage | 0 | Low -> High |
| Z5 | High voltage | 0 | Low -> High |
|  | Low voltage | 0 | Low |
| Z6 | High voltage | 1 | Low |
|  | Low voltage | 1 | Low -> High |
| Z4, Z10 | Don't care | 0 | High |

Compared to reading the target memory cells while ignoring neighbor cell information, in low confidence zones the confidence levels are determined to '0' or '1' depending on whether the neighbor cell increases the probability of '0' or '1' in the zone, and the bit values remain unchanged. Moreover, in the high confidence zones, the bit value and confidence levels are not affected by the voltages of the neighbor memory cells.

The upper diagram in FIG. 5B depicts TVDs of target memory cells affected by neighbor memory cells having high voltages (N=0), whereas the lower diagram depicts TVDs of target memory cells affected by neighbor memory cells having low voltages (N=1).

In accordance with the truth tables, the data bits are given by the expression D=M and the confidence levels are given by the logical expression S=(R+L) & (R+N+M). In an alternative embodiment, S may be given by the logical expression S=(R+L) & (L+N+M') wherein M' denotes a bitwise logical inversion operation applied to M.

In accordance with the truth tables, the low confidence zones correspond to bits in which L≠M or M≠R. In these zones the confidence levels in S depend on the bits of N. Moreover, in this scheme, D depends only on M (and not any of L, R and N).

FIG. 5C is a block diagram that schematically illustrates combinational logic implementing the truth tables in FIG. 5B, in accordance with an embodiment that is described herein.

In the block diagram, the combinational logic circuit receives the target readouts L, M and R, and the neighbor readout N. In some embodiments, N is generated by reading the neighbor WL using a read voltage positioned at the middle of the voltage axis, e.g., at a middle position between zone 5 and 6. Alternatively, N can be sampled using any other suitable read voltage. The combinational logic outputs data bits D and respective confidence levels S assigned to the data bits. In the present example, the combinational logic comprises three logical XOR gates and a logical AND gate.

The combinational logic circuit of FIG. 5C is given by way of example, and other suitable logical combinational circuits can be used for implementing the truth table of FIG. 5B. Further alternatively, the truth tables may be implemented using a lookup table instead of or in addition to using explicit logical gates.

One benefit of using the logical circuit of FIG. 5C for crosstalk mitigation is the improvement in ECC decoding performance due to the modifications to the confidence levels compared to decoding while ignoring N. in D. Another benefit is that since some of the low confidence levels are modified to high confidence levels, the resulting S contains a small number of low confidence bits. Consequently, in an embodiment, the resulting S is sparse and may be compressed significantly, thus reducing the amount of traffic sent from the memory device to the memory controller.

In some embodiments, the level of crosstalk caused by neighbor cells may depend on the underlying storage technology or vary over time. For example, the effect of crosstalk on the number of read errors may become more severe as the memory device ages. In some embodiments, when the crosstalk level exceeds a specified extreme crosstalk threshold, the shifted TVDs may become dominant over the adjacent TVDs in certain low confidence zones. In such embodiments, '1' bits falling in certain low confidence zones may be advantageously flipped to '0' bits, and '0' bits flipped to '1' bits, to increase the probability of successful ECC decoding.

In some embodiments, upon detecting that the crosstalk level exceeds a specified crosstalk level threshold, the memory device transmits to the memory controller the outputs D and S calculated by the combinational logic of FIG. 5C (as in the non-extreme crosstalk level case), and the memory controller manages the bit switching in D for compensating for the high crosstalk level.

In the scheme based on three target readouts, without taking the neighbor cells into consideration, the data bits and confidence levels are classified into four categories, as depicted in Table 3 above. It is sometimes desirable, however, that the D and S bits specify only three categories, namely—"high confidence 1 bit", "high confidence 0 bit" and "low confidence". A reading scheme of this sort is now described.

Figure 6B:
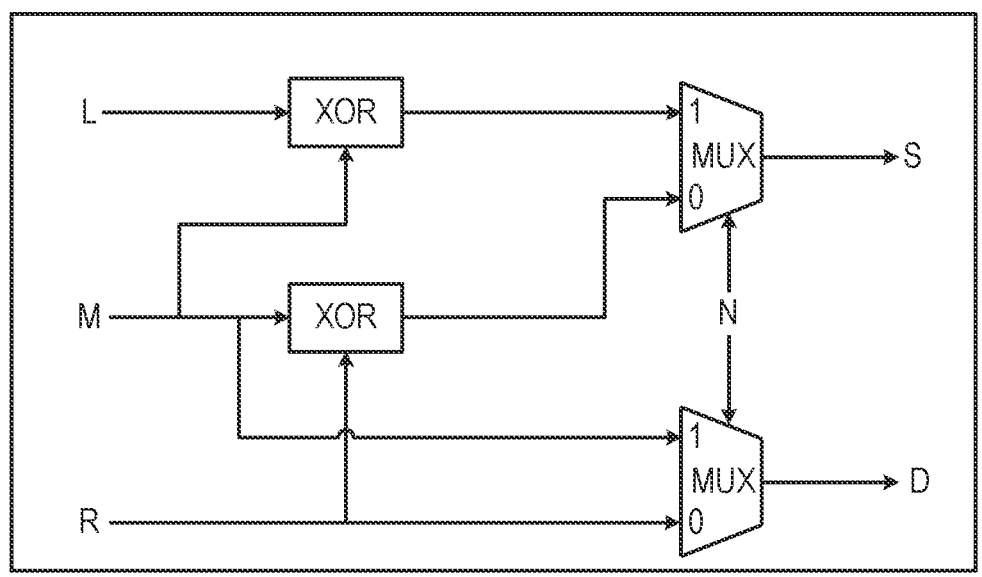

FIGS. 6A-6B diagrams are that schematically illustrate TVDs of memory cells in a target WL affected by memory cells of a neighbor WL, as well as truth tables and combinational logic implementing crosstalk mitigation using three target readouts, in accordance with other embodiments that are described herein.

The diagrams of FIG. 6A are similar to those of FIG. 5B but employ different truth tables for generating the data bits D and confidence levels S. In the upper for lower) diagram of FIG. 6A the TVDs are shifted to the right (or left). Table 5 summarizes bit values and confidence levels per zone depending on the neighbor voltage.

TABLE 5 bit values and confidence levels per zone depending on neighbor voltage.

| Zone | Neighbor voltage | Bit value | Confidence |
|---|---|---|---|
| Z1, Z7 | Don't care | 1 | High |
| Z2, Z8 | High voltage | 1 | Low -> High |
| | Low voltage | Undetermined | Low |
| Z3, Z9 | High voltage | Undetermined | Low |
| | Low voltage | 0 | Low -> High |
| Z5 | High voltage | 0 | Low -> High |
| | Low voltage | Undetermined | Low |
| Z6 | High voltage | Undetermined | Low |
| | Low voltage | 1 | Low -> High |
| Z4, Z10 | Don't care | 0 | High |

In accordance with the truth tables of FIG. 6A, the data bits are given by the logical expression D=N?(M:R) and the confidence levels are given by the logical expression S=N?(L+M:M+R), wherein the logical expression N?(A:B) means selecting A when N=1 (low voltage neighbor) and B when N=0 (high voltage neighbor). In an alternative embodiment, D may be given by the expression D=N?(L:M).

It is noted that the data bit values corresponding to low confidence levels carry no significance. For example, referring to zone Z2 for low voltage neighbor distribution, although this zone is labeled in the truth table as a low confidence '1', the TVD indicates that cells in this zone are more likely to be programmed to '0'. On the other hand, zone Z3 for the high voltage neighbor distribution is also labeled in the truth table as a low confidence '1', and indeed cells in this zone are more likely to be programmed to '1'.

FIG. 6B is a block diagram that schematically illustrates combinational logic implementing the truth tables in FIG. 6A, in accordance with an embodiment that is described herein.

In the block diagram, one multiplexer selects, based on N, between the outcomes (L XOR M) and (M XOR R), to produce S. Another multiplexer in the block diagram selects, based on N, between M and R, to produce D.

The combinational logic circuit of FIG. 6B is given by way other suitable logical of example, and combinational circuits can be used for implementing the truth table of FIG. 6A. For example, the truth tables may be implemented using a lookup table instead of or in addition to using explicit logical gates.

Although the ECC decoding performance while applying the logical circuit of FIG. 5C outperforms that of FIG. 6B, using the logical circuit of FIG. 6B results in significant error correction gain compared to ignoring the neighboring cells, and may have reduced complexity in certain read protocols.

The embodiments described above are given by way of example, and other suitable embodiments can also be used. For example, although the embodiments above refer mainly to TLC devices that store three bits per cell, the disclosed embodiments are similarly applicable to memory devices storing a number of bits per cell other than three.

In the embodiments above, crosstalk mitigation is implemented within the memory device. In alternative embodiments, however, crosstalk mitigation may be implemented by the memory controller, or divided between the memory controller and memory device.

In the embodiments above, the RVs are typically set around optimal middle voltages between adjacent TVDs, e.g., achieving error for minimal bit rate. In alternative embodiments, the RVs may be set around middle voltages deviating from the optimal middle voltages.

Although the embodiments described above refer mainly to crosstalk mitigation implemented in the memory device, in other embodiments, the disclosed embodiments may be implemented in hardware in the memory controller or divided between the memory device and memory controller.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A storage system, comprising:
multiple memory cells arranged in multiple Word Lines (WLs), including a target WL; and
circuitry comprising combinational logic implemented in hardware, the circuitry configured to:
read a page from a group of target memory cells in the target WL multiple times, so as to produce multiple respective target binary readouts including at least a left target binary readout, a middle target binary readout, and a right target binary readout;
read a group of neighbor memory cells in a WL neighboring to the target WL so as to produce a single neighbor binary readout;
apply the combinational logic to calculate (i) output bits of the page, and (ii) respective binary confidence levels associated with the output bits, as logical expressions of the left target binary readout, the middle target binary readout, the right target binary readout and the neighboring binary readout; and
transmit the output bits and the binary confidence levels to a controller.

2. The storage system according to claim 1, wherein the combinational logic is configured to set the output bits to respective bits of the middle binary readout, and to calculate the binary confidence levels by comparing between the left target binary readout and the middle target binary readout, or between the middle target binary readout and the right target binary readout depending on the neighbor binary readout.

3. The storage system according to claim 1, wherein the combinational logic is configured to calculate the output bits by selecting between the middle target binary readout and one of the left target binary readout and the right target binary readout based on the neighbor binary readout.

4. The storage system according to claim 1, wherein the combinational logic is configured to calculate the binary confidence levels by selecting, based on the neighbor binary readout, between (i) a first comparison outcome between the middle target binary readout and the left target binary readout, and (ii) a second comparison outcome between the middle target binary readout and the right target binary readout.

5. The storage system according to claim 1, wherein at least some of the memory cells in the group of target memory cells are subjected to voltage shifts due to respective neighbor memory cells having high or low voltages, and wherein the combinational logic is configured to determine the output bits and the binary confidence levels so as to compensate for the voltage shifts.

6. The storage system according to claim 1, wherein a voltage axis is divided by multiple specified read thresholds into high confidence zones and low confidence zones, and wherein the combinational logic is configured to determine the output bits in the high confidence zones independently of the neighbor memory cells.

7. The storage system according to claim 1, wherein the combinational logic is configured to set undetermined output bits for target memory cells evaluated as having low confidence levels.

8. The storage system according to claim 1, wherein the circuitry resides in a memory device comprising the memory cells.

9. A method for data storage, comprising:
in a storage system comprising circuitry that comprises combinational logic implemented in hardware, and multiple memory cells arranged in multiple Word Lines (WLs), including a target WL,
reading by the circuitry a page from a group of target memory cells in the target WL multiple times, so as to produce multiple respective target binary readouts including at least a left target binary readout, a middle target binary readout, and a right target binary readout;
reading by the circuitry a group of neighbor memory cells in a WL neighboring to the target WL so as to produce a single neighbor binary readout;
applying the combinational logic to calculate (i) output bits of the page, and (ii) respective binary confidence levels associated with the output bits, as logical expressions of the left target binary readout, the middle target binary readout, the right target binary readout and the neighboring binary readout; and
transmitting the output bits and the binary confidence levels to a controller.

10. The method according to claim 9, wherein applying the combinational logic comprises setting the output bits to respective bits of the middle binary readout, and calculating the binary confidence levels by comparing between the left target binary readout and the middle target binary readout, or between the middle target binary readout and the right target binary readout depending on the neighbor binary readout.

11. The method according to claim 9, wherein applying the combinational logic comprises selecting between the middle target binary readout and one of the left target binary readout and the right target binary readout based on the neighbor binary readout.

12. The method according to claim 9, wherein applying the combinational logic comprises calculating the binary confidence levels by selecting, based on the neighbor binary readout, between (i) a first comparison outcome between the middle target binary readout and the left target binary readout, and (ii) a second comparison outcome between the middle target binary readout and the right target binary readout.

13. The method according to claim 9, wherein at least some of the memory cells in the group of target memory cells are subjected to voltage shifts due to respective neighbor memory cells having high or low voltages, and comprising determining the output bits and the binary confidence levels so as to compensate for the voltage shifts.

14. The method according to claim 9, wherein a voltage axis is divided by multiple specified read thresholds into high confidence zones and low confidence zones, and comprising determining the output bits in the high confidence zones independently of the neighbor memory cells.

15. The method according to claim 9, and comprising, setting by the combinational logic undetermined output bits for target memory cells evaluated as having low confidence levels.

16. The method according to claim 9, wherein the circuitry resides in a memory device comprising the memory cells.

17. A storage system, comprising:
multiple memory cells arranged in multiple Word Lines (WLs), including a target WL; and
circuitry comprising combinational logic implemented in hardware, the circuitry configured to:
read a page from a group of target memory cells in the target WL multiple times to produce multiple respective target binary readouts;
read a group of neighbor memory cells in a WL neighboring to the target WL so as to produce a single neighbor binary readout;
apply the combinational logic to both the target binary readouts and the neighbor binary readout to produce (i) output bits of the page, and (ii) respective binary confidence levels associated with the output bits; and
transmit the output bits and the binary confidence levels to a controller,
wherein a voltage axis is divided by multiple specified read thresholds into high confidence zones and low confidence zones, and wherein the combinational logic is configured to determine the output bits in the high confidence zones independently of the neighbor memory cells.

* * * * *